(12) United States Patent
Rau et al.

(10) Patent No.: US 12,366,332 B2
(45) Date of Patent: Jul. 22, 2025

(54) FUEL CELL SYSTEM, GAS TANK DEVICE AND SHUT-OFF VALVE FOR A GAS TANK DEVICE

(71) Applicant: Robert Bosch GmbH, Stuttgart (DE)

(72) Inventors: Andreas Rau, Stuttgart (DE); Joachim Soubari, Ettlingen (DE); Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 18/565,823

(22) PCT Filed: May 18, 2022

(86) PCT No.: PCT/EP2022/063416
§ 371 (c)(1),
(2) Date: Nov. 30, 2023

(87) PCT Pub. No.: WO2022/258327
PCT Pub. Date: Dec. 15, 2022

(65) Prior Publication Data
US 2024/0255109 A1    Aug. 1, 2024

(30) Foreign Application Priority Data

Jun. 9, 2021   (DE) .................... 10 2021 205 810.8

(51) Int. Cl.
*F17C 13/04*         (2006.01)
*F16K 31/06*         (2006.01)
(52) U.S. Cl.
CPC .......... *F17C 13/04* (2013.01); *F16K 31/0606* (2013.01); *F16K 31/0651* (2013.01);
(Continued)
(58) Field of Classification Search
USPC ............... 251/30.02, 31, 129.21, 129.22; 137/505.29, 506, 870, 871
See application file for complete search history.

(56) References Cited

U.S. PATENT DOCUMENTS 3,312,445 A * 4/1967 Trombatore ............ F16K 31/40
                                                    251/129.21
5,529,387 A * 6/1996 Mialkowski .......... F16K 31/408
                                                    251/129.21
(Continued)

FOREIGN PATENT DOCUMENTS

| DE | 102006027712 A1 | 12/2006 |
| JP | 2012189108 A | 10/2012 |
| JP | 2020526725 A | 8/2020 |
| WO | 2012017667 A1 | 2/2012 |

OTHER PUBLICATIONS

Translation of International Search Report for Application No. PCT/EP2022/063416 dated Sep. 26, 2022 (2 pages).

*Primary Examiner* — Matthew W Jellett
(74) *Attorney, Agent, or Firm* — Michael Best & Friedrich LLP

(57) ABSTRACT

The invention relates to a shut-off valve comprising: a housing which has an inlet opening, an outlet opening and a control opening, wherein the housing defines an inner space extending along a longitudinal axis and has a partition which divides the inner space into an outlet chamber and a control chamber and has a guide hole which extends between the outlet chamber and the control chamber; an electrical coil which is accommodated in the partition and surrounds the guide hole; a servo valve needle which is arranged in the control chamber, is preloaded along the longitudinal axis into a closed position in which it seals the control opening, and can be moved, by means of a magnetic field which can be generated by the coil, into an open position in which it exposes the control opening and abuts the partition, wherein the servo valve needle has a connecting channel which connects the control chamber to the guide hole in the open position of the servo valve needle; and a main valve needle which is movably guided in the guide hole along the longitudinal axis, is preloaded along the (Continued)

longitudinal axis into a closed position in which it seals the outlet opening, and, when the servo valve needle is arranged in its open position, can be moved, by means of the magnetic field which can be generated by the coil, into an open position in which it exposes the outlet opening.

13 Claims, 4 Drawing Sheets

(52) U.S. Cl.
CPC .... *F16K 31/0675* (2013.01); *F16K 2200/301* (2021.08); *F17C 2205/0326* (2013.01); *F17C 2205/0385* (2013.01); *F17C 2205/0391* (2013.01); *F17C 2223/0123* (2013.01); *F17C 2223/036* (2013.01)

(56) References Cited

U.S. PATENT DOCUMENTS

| | | | |
|---|---|---|---|
| 6,675,831 B2* | 1/2004 | Sakaguchi | F17C 1/14 137/613 |
| 9,194,354 B2 | 11/2015 | Ninomiya et al. | |
| 9,347,580 B2 | 5/2016 | Ninomiya et al. | |
| 11,649,906 B2* | 5/2023 | Park | F16K 31/0696 251/129.15 |
| 2006/0283510 A1 | 12/2006 | Pechtold | |
| 2007/0290152 A1* | 12/2007 | Ma | F16K 31/406 251/30.01 |
| 2018/0038507 A1 | 2/2018 | Ninomiya et al. | |
| 2019/0145541 A1 | 5/2019 | Vopel et al. | |

\* cited by examiner

FUEL CELL SYSTEM, GAS TANK DEVICE AND SHUT-OFF VALVE FOR A GAS TANK DEVICE

BACKGROUND

The present invention relates to a fuel cell system, a gas tank device, in particular for a fuel cell system, and a shut-off valve for a gas tank device.

Fuel cell systems typically comprise a fuel cell system, e.g., in the form of a stack comprising a plurality of electrically inline fuel cells supplied from a tank via a fuel supply line of gaseous fuel, e.g., hydrogen. In both stationary and mobile applications, such as in a vehicle, the gaseous fuel in the tank is typically at high-pressure, which may, for example, be up to 700 bar or more. The tank thereby forms a high-pressure reservoir. The fuel is typically supplied to the fuel cell system at a lower pressure, e.g. at a pressure ranging from 2 bar to 20 bar. The fuel supply line forms a supply line. For example, the fuel supply line can be connected to the tank by a pressure control device, in which the pressure of the fuel is reduced. The line between the tank and the pressure control device is typically designed as a high-pressure line (hereinafter referred to as a supply line, as it supplies fuel to the fuel cell system). The tank is typically provided with a shut-off valve to shut off fuel leakage from the tank, e.g., when the fuel cell system is taken out of service or in the event of a failure.

Such high-pressure gas tank shut-off valves are typically designed as non-powered closed solenoids. Typically, a valve needle is preloaded against a sealing seat by a spring, and is detachable from the sealing seat by a magnetic force generated by a coil against the preloading force of the spring. Due to the high-pressure in the tank, high opening forces can be required depending on the valve design, making it difficult to miniaturize the valve.

DE 10 2006 027 712 A1 discloses a shut-off valve for a hydrogen pressure tank with a housing, comprising a first valve seat and a second valve seat, and a valve stem that is movable through an electrical coil, which supports first and second sealing elements spaced apart on its outer circumference. In a closed position of the valve, the sealing elements are preloaded against the valve seats by a spring to seal an inlet from an outlet that is formed between the valve seats in the housing. The valve stem comprises a first opening which forms a fluidic connection between the inlet and a high-pressure side of the first sealing element. A closing force is thereby applied to the first sealing element as a result of the pressure that is applied to the inlet. The valve stem further comprises a through-hole connecting a secondary chamber located on a low-pressure side of the second sealing element to the inlet. An opening force is thereby applied to the second sealing element, that acts in the opposite direction to the closing force acting on the first sealing body. The aim of this design is to reduce a force acting on the valve stem or the sealing elements due to the pressure differential in order to reduce the opening force that must be generated by the electrical coil to open the valve.

SUMMARY

Provided according to the disclosure are a shut-off valve, a gas tank device, and a fuel cell system.

According to a first aspect of the invention, a shut-off valve for a gas tank device comprises a housing which has an inlet opening for connecting to a high-pressure tank, an outlet opening for connecting to a supply line, and a control opening for connecting to the supply line, whereby the housing defines an inner space extending along a longitudinal axis and has a partition which, with respect to the longitudinal axis, divides the inner space into an outlet chamber and a control chamber, said partition having a guide hole which extends between the outlet chamber and the control chamber. The shut-off valve also has an electrical coil which is accommodated in the partition and surrounds the guide hole, and a servo valve needle which is arranged in the control chamber, is preloaded along the longitudinal axis into a closed position in which it seals the control opening, and can be moved, by means of a magnetic field which can be generated by the coil, into an open position in which it exposes the control opening and abuts the partition, the servo valve needle having a connecting channel which connects the control chamber to the guide hole in the open position of the servo valve needle. The shut-off valve also has a main valve needle which is movably guided in the guide hole along the longitudinal axis, is preloaded along the longitudinal axis into a closed position in which the main valve needle seals the outlet opening and, when the servo valve needle is arranged in its open position, can be moved, by means of the magnetic field which can be generated by the coil, into an open position in which it exposes the outlet opening.

According to a second aspect of the invention, a gas tank device, particularly for a fuel cell system, comprises a high-pressure gas tank for accommodating gas, e.g. hydrogen, and a shut-off valve according to the first aspect of the invention, the inlet opening of the housing of the shut-off valve being connected to an outlet opening of the high-pressure gas tank.

According to a second aspect of the invention, a fuel cell system comprises a fuel cell system having at least one fuel cell, a fuel inlet for supplying gaseous fuel, an oxidation gas inlet for supplying oxidation gas, and a product outlet for removing reaction products, a fuel supply line connected to the fuel inlet, and a gas tank device according to the second aspect of the invention, whereby the outlet opening and the control opening of the shut-off valve housing are each connected to the fuel supply line.

One idea underlying the invention is to arrange a servo valve needle and a main valve needle in a housing, both of which can be actuated by the same coil. A control opening that can be sealed by the servo valve needle and a high-pressure outlet that can be sealed by the main valve needle are both connectable to the same supply line, so that the same pressure level is applied to them.

The reliability of the fuel cell's fuel supply can be improved if the shut-off valve can be reliably opened at both low and high pressure levels in the supply line, and at the same pressure level in the tank and in the supply line.

The principle regarding opening when there is a lower pressure level in the supply line than in the tank is described by way of example hereinafter.

When the coil is powered, a primary solenoid circuit is formed, thereby generating a solenoid force that acts on the servo valve needle and moves the servo valve needle to an open position. As a result, the servo valve needle exposes the control opening, and the pressure within a control space or control chamber of the housing in which the servo valve needle is arranged is thereby decreased. The main valve needle is axially guided in a guide hole formed in a partition wall of the housing separating the control chamber from an outlet chamber in which the outlet chamber is connected or can be connected via an inlet to a gas tank or high-pressure reservoir. A fluidically conductive connection exists between the guide hole and the control chamber via a channel provided in the servo valve needle. Consequently, when the valve is opened, a pressure drop is achieved in the guide hole, thereby applying a pulling force to the main valve needle. When the servo valve needle is opened, it also abuts the partition wall of the housing so that, if the coil continues to be powered, a secondary solenoid circuit forms, thereby generating a solenoid force that acts on the main valve needle. In addition, as the main valve needle is subjected to a pulling force by the reduced pressure in the control chamber, even a low solenoid force produced by the coil can cause the main valve needle to open. A pressure gradient as well as a minimum possible pressure level in the control space or the control chamber results from the outlet throttle, briefly A-throttle, at the valve seat of the servo valve needle and the inlet throttle, briefly Z-throttle, a pneumatic connection between the control chamber and the outlet chamber, as well as the respective outlet and inlet side pressure levels.

The opening procedure at the same or approximately the same pressure level in the supply line and tank is described below.

When the coil is powered, a primary solenoid circuit is formed again, thereby generating a solenoid force that acts on the servo valve needle and moves the servo valve needle to an open position. Given the equal pressure levels in the supply line, control chamber and outlet chamber, the pressure differential at the servo valve seat and main valve seat is zero or nearly zero, respectively. After the servo valve has been opened, the secondary magnetic field at the anchor of the main valve is therefore sufficient to fully open the main valve against the force of the spring, even without pneumatic support from the control chamber.

One advantage of the invention is therefore that the main valve needle can be moved from the closed position to the open position with a low opening force, even with large pressure differentials between the high-pressure gas tank and the supply line. Consequently, the coil, which at least partially generates the opening force, can be sized relatively small so that a compactly constructed shut-off valve is achieved. Furthermore, it is advantageous in the design of the shut-off valve according to the invention that a stroke of the servo valve needle be independent of the stroke of the main valve needle. In particular, a large stroke of the main valve needle in comparison to the stroke of the servo valve needle can be achieved using a compact coil design. A further advantage is that even when the pressure is equalized between the control chamber and the outlet chamber, closing of the main valve needle is prevented, as it is maintained in its open position by the magnetic force generated by the coil. This advantageously reduces wear on the shut-off valve.

Advantageous embodiments and further developments follow from the dependent claims and from the description with reference to the drawings.

According to some embodiments, it can be provided that the partition comprises an accommodating recess surrounding the guide hole and extending from the control chamber along the longitudinal axis as a blind hole, the coil being arranged in the accommodating recess. For example, the accommodating recess can extend from a surface facing the control chamber and act as an annular opening. A residual separator is therefore provided between a bottom of the accommodating recess and a surface of the partition facing the outlet chamber. If the servo valve needle abuts the partition in its open position, then the coil can be powered such that magnetic saturation adjusts in the residual separator. Doing so facilitates the generation of a secondary solenoid circuit or field that efficiently acts on the main valve needle.

According to some embodiments, the main valve needle can have a stem guided in a first end region in the guide hole and a sealing section formed in a second end region of the stem, abutting a main valve seat defined by the outlet opening in the closed position of the main valve needle. For example, the stem can be made of a magnetizable material and advantageously acts as a plunger.

According to some embodiments, a sealing element can be provided between the first end portion of the main valve needle stem and the guide hole to fluidically isolate the control chamber from the outlet chamber. For example, the sealing element can be embodied as a sealing ring and attached to the stem of the main valve needle. According to some embodiments, it can be provided that a throttle bore fluidically connects the control chamber to the outlet chamber. A pneumatic connection between the control chamber and the outlet chamber can thereby be achieved via a guide clearance between the main valve needle or the stem of the main valve needle and the guide hole or, when using sealing elements on the stem of the main valve needle, also separately via a throttle bore as a bypass to the seal.

According to some embodiments, the first end region of the stem of the main valve needle can have a first cross-sectional area that is greater than a second cross-sectional area of the main valve seat. This can advantageously further increase the pulling force generated by the pressure drop in the control chamber, in particular such that this pulling force alone is sufficient to lift the main valve needle away from the main valve seat. This further reduces the force to be generated by the coil, which is advantageous with regard to a compact design of the coil.

According to some embodiments, it can be provided that the main valve needle comprises a flat anchor projecting from the stem, which is arranged at a distance from the partition in the closed position of the main valve needle, and abuts the partition in the open position of the main valve needle. The partition is made of a magnetizable material. The radial extension of the flat anchor forms a gap between the partition and the flat anchor in the closed position of the main valve needle. Particularly in combination with the arrangement of the coil in the accommodating recess described hereinabove, the force effect of the secondary magnetic field generated by the coil on the main valve needle can be advantageously further increased.

According to some embodiments, the servo valve needle comprises a stem, a sealing section formed at a first end region of the stem, and a flat anchor connected to a second end region of the stem, which protrudes from the stem, whereby, in the closed position of the servo valve needle, the sealing section abuts a servo valve seat defined by the control opening and the flat anchor is arranged at a distance from the partition, and whereby, in the opening position of the servo valve needle, the sealing section is arranged at a distance from the servo valve seat, and the flat anchor abuts the partition. The flat anchor of the servo valve needle in particular offers the advantage that a large opening force can be generated with a low stroke of the servo valve needle.

According to some embodiments, the servo valve needle and the main valve needle can be preloaded to the respective closed position by a common spring that is arranged in the guide hole. The number of parts is thereby advantageously reduced.

According to some embodiments, the shut-off valve can be provided to comprise a control line that connects the outlet opening and the control opening outside the inner space in a fluidically conducting manner, and comprises a connector used for connection to the supply line. According to alternative embodiments, it can be provided that the housing comprises a first connector which connected to the outlet opening and used for connection to the supply line, and a second connector which connected to the control opening and used for connection to the supply line. In both alternatives, the same low pressure level is easily adjustable at the control opening and the outlet opening.

According to some embodiments of the gas tank device, it can be provided that the housing of the shut-off valve is accommodated in the outlet opening of the high-pressure gas tank. For example, the high-pressure gas tank can comprise a gas cylinder comprising a substantially cylindrical portion and an outlet opening or neck that is tapered opposite the cylindrical portion in which the outlet opening is formed. The compact design of the shut-off valve enables its accommodation within the outlet opening, thereby better protecting the shut-off valve against mechanical damage.

BRIEF DESCRIPTION OF THE DRAWINGS

The invention will be explained hereinafter with reference to the figures of the drawings. The drawings include.

Unless otherwise stated, identical reference characters refer to identical or functionally identical components shown in the drawings.

DETAILED DESCRIPTION

Figure 4:
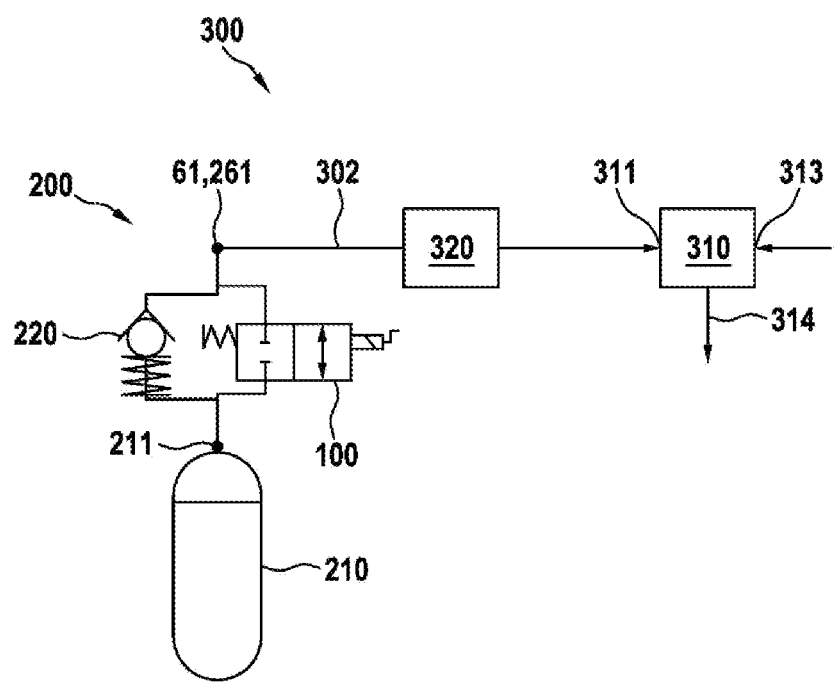
FIG. 4 a schematic view of a hydraulic diagram of a fuel cell system according to an exemplary embodiment of the invention.

FIG. 4 shows an exemplary and schematic illustration of a fuel cell system 300. As schematically shown in FIG. 4, the fuel cell system 300 comprises a fuel cell system 310, a fuel supply line 302, an optional pressure control device 320, and a gas tank device 200.

The fuel cell system 310 is shown as a block only in FIG. 4, and comprises at least one fuel cell (not shown), a fuel inlet 311, an oxidation gas inlet 313, and a product outlet 314. For example, the fuel cell arrangement can comprise a plurality of serially electrically connected fuel cells, e.g. in the form of a so-called stack. Each fuel cell typically comprises an anode, a cathode, and an electrolytic layer that is arranged between the anode and the cathode, e.g. in the form of a membrane. Via the fuel inlet 311, gaseous fuel, e.g. hydrogen, can be supplied to the anode(s) of the fuel cell(s) 210. Similarly, oxidation gas, e.g. ambient air containing oxygen, can be supplied to the cathodes via the oxidation gas inlet 213 of the one or more fuel cells 210. The reaction products can be removed from the cathode via the product outlet 214. The at least one fuel cell is thereby configured to directly convert the chemical energy stored in the fuel into electrical energy together with oxidation gas.

The gas tank device 200 comprises a high-pressure gas tank 210 and a shut-off valve 100. The high-pressure gas tank 210 (hereinafter referred to merely as a tank for purposes of clarity) is designed to receive gas, such as hydrogen, and can store gas at a pressure of up to 700 bar, for example. As schematically shown in FIG. 4, the tank 210 can be designed as a substantially cylindrical tank. An outlet opening 211 of the tank 210 can be arranged, for example, at an axial end of the tank 210. The shut-off valve 100 is merely symbolically shown in FIG. 4, and will be explained in detail below. As schematically shown in FIG. 4, the shut-off valve 100 is connected to the outlet opening 211 and a low-pressure connector 261 of the tank 210. Optionally, a check valve 220 can be switched in parallel to the shut-off valve 100, as shown by way of example in FIG. 4. The fuel supply line 302 connects the low-pressure connector 261 of the gas tank device 200 to the fuel inlet 311 of the fuel cell system 310. The optional pressure control device 320 is arranged between the low-pressure connector 261 and the fuel inlet 311 in the fuel supply line 302, and is configured to reduce the pressure of gas flowing out of the tank 210 and/or vary the amount of flow. For example, the pressure control device 320 can comprise a flow-controllable throttle valve.

Figure 1:
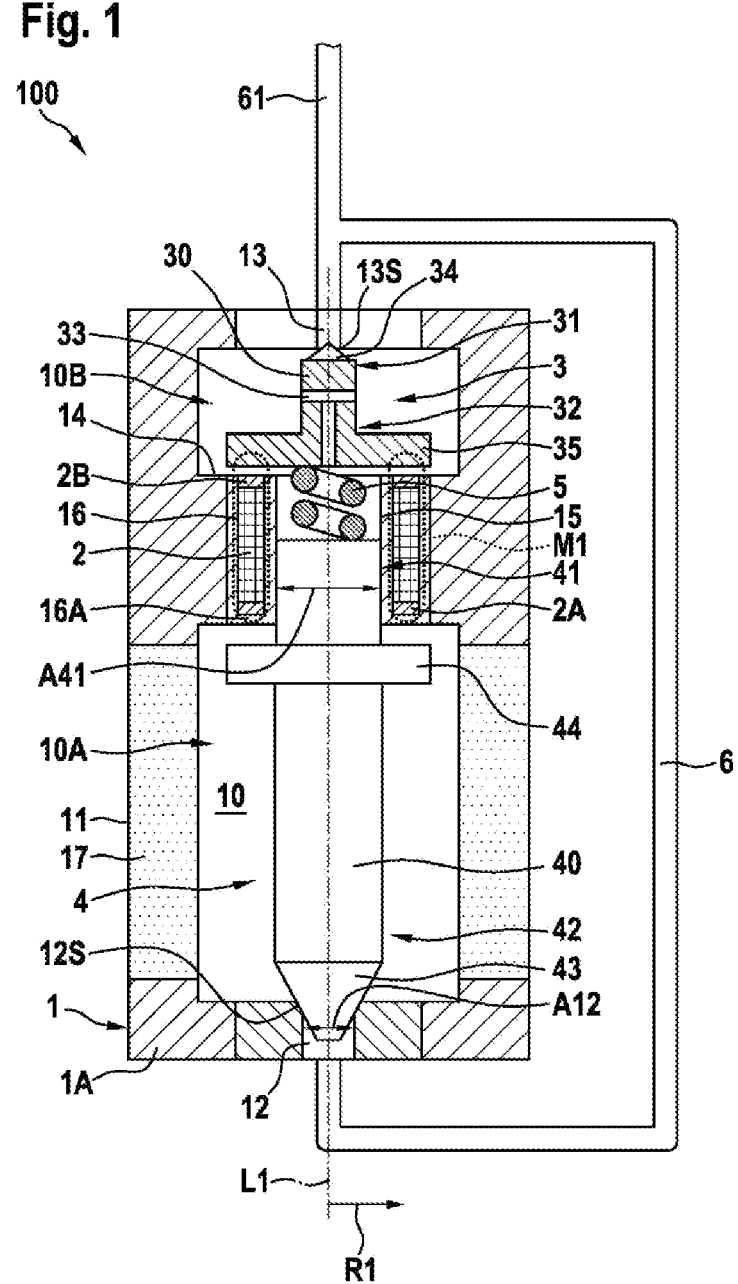
FIG. 1 a schematic cross-sectional view of a shut-off valve according to an exemplary embodiment of the invention, a servo valve needle and a main valve needle each being arranged in a closed position.

A schematic cross-sectional view of an exemplary shut-off valve 100 is shown in FIG. 1, such as can be used in the gas tank device 200 shown in FIG. 4. As schematically shown in FIG. 1, the shut-off valve 100 comprises a housing 1, an electrical coil or induction coil 2, a servo valve needle 3, a main valve needle 4, and a spring 5. Optionally, the shut-off valve 100 can further comprise a control line 6, as schematically shown in FIG. 1.

The housing 1 can in particular comprise a base body 1A, which defines an inner space 10 extending along a longitudinal axis L1. As schematically shown in FIG. 1, a partition or partition wall 14 is arranged in the inner space 10 of the housing 1, thereby dividing the inner space 10 into a first compartment or outlet chamber 10A and a second compartment or control chamber 10B in relation to the longitudinal axis L1. The partition 14 can in particular extend in a radial direction R1 extending transverse to the longitudinal axis L1, as shown as an example in FIG. 1. The partition 14 can in particular be made of a magnetizable material.

A guide hole 15 is formed in the partition 14, thereby connecting the control chamber 10B and the outlet chamber 10A to each other. The guide hole 15 can be arranged and aligned coaxially to the longitudinal axis L1, for example, as schematically shown in FIG. 1. Optionally, the partition 14 can further comprise an accommodating recess 16. As schematically shown in FIG. 1, the accommodating recess can extend from a surface of the partition 14 facing the control chamber 10B along the longitudinal axis L1 and terminate at a gap from a surface of the partition 14 facing the outlet chamber 10A. The accommodating recess 16 thereby extends from the control chamber 10B along the longitudinal axis L1 and acts as a blind hole. A residual separator 16A is therefore provided between the surface of the partition 14 facing the control chamber 10B and the bottom or the end of the accommodating recess 16. As further schematically shown in FIG. 1, the accommodating recess 16 surrounds the longitudinal axis L1 and the guide hole 15. For example, the accommodating recess 16 can be formed as a ring or frame around the guide hole 16.

As further shown in FIG. 1, the housing 1 comprises an inlet opening 11, an outlet opening 12, and a control opening 13. The inlet opening 11 provides a connection to a high-pressure reservoir. For example, the inlet opening 11 can be connected to the outlet opening 211 of the tank 210. as shown as an example in FIG. 1, the base part 1A of the housing 1 can have a plurality of recesses extending in the radial direction R1 between the outlet chamber 10A and an outer side as inlet openings 11. Generally, the inlet opening 11 is connected to the first chamber or the outlet chamber 10A. As also shown in FIG. 1, a filter 17 can optionally be arranged in the inlet opening 11.

The outlet opening 12 can in particular be arranged coaxially to the longitudinal axis L1 and extend in the base part 1A between the outlet chamber 10A and the outer side, as shown as an example in FIG. 1. Generally, the outlet opening 12 is connected to the outlet chamber 10A.

The control opening 13 can in particular be arranged opposite the outlet opening 12 in relation to the longitudinal axis L1, as shown as an example in FIG. 1. The control opening 13 is connected to the control chamber 10B. For example, as shown in FIG. 1, the control opening 13 can be coaxially arranged in relation to the longitudinal axis L1 and can extend in the base portion 1A between the control chamber 10B and the outer side.

As schematically shown purely by way of example in FIG. 1, the outlet opening 11 and the control opening 13 can be connected to each other in a fluidically conductive manner by way of the optional control line 6, in which case the control line 6 runs outside of the inner space 10 or is fluidically separated or isolated from the inner space 10 of the housing 1. For example, the control line 61 can comprise a connector 61 used for connection to the supply line 302. For example, the connector 61 of the control line 61 can form the low-pressure connector 261 of the gas tank device 200, as schematically shown in FIG. 4. Alternatively, the housing 1 can comprise a first connector which connected to the outlet opening 11 (not shown in FIG. 1) and a second connector which is connected to the control opening 13 (not shown in FIG. 1), in which case the first and second connectors are each connectable to the supply line 302. In this case, the first and second connectors together form the low-pressure connector 261 of the gas tank device 200. In general, the control opening 13 and the outlet opening 12 are each at the same pressure level, in particular connectable or connected to the same supply line.

The coil 2 comprises a plurality of windings made of an electrical conductor, and is merely symbolically shown in FIG. 1. As shown in FIG. 1, the coil 2 can, e.g., be accommodated in the accommodating recess 16 of the partition 14. In particular, a magnetically insulating layer 2A can be arranged between the bottom of the accommodating recess 16 and the coil 2. Similarly, the end of the accommodating recess 16 facing the control chamber 10B can be closed by a magnetically insulating layer 2B, as shown by way of example in FIG. 1. The coil 2 is generally accommodated in the partition 14 and surrounds the guide hole 15.

The servo valve needle 3 is arranged in the control chamber 10B. As shown as an example in FIG. 1, the servo valve needle 3 can comprise a stem 30, a connecting channel 33, and a sealing section 34. Further, the servo valve needle 3 can optionally comprise a flat anchor 35. The stem 30 extends between a first end region 31 and a second end region 32 opposite thereto. The sealing section 34 is formed in the first end region 31 of the stem 30, and can in particular form a first end of the stem 30. For example, the sealing section 34 can be conical, as schematically shown in FIG. 1. For example, the connecting channel 33 can be formed by a transverse hole extending transversely through the stem 30 and an axial hole extending between a second end and the transverse hole, as schematically shown in FIG. 1. Alternatively, it would also be possible to create the connecting channel by way of a hole extending obliquely between a circumferential surface of the stem 30 and the second end of the stem 30. The optional flat anchor 35 is arranged in and connected to the second end region of the stem 30. As schematically shown in FIG. 1, the flat anchor 35 extends transversely to and protrudes from the stem 30. The flat anchor 35 can, e.g., be designed as a bar running around the stem 30, as shown schematically in FIG. 1. At least the flat anchor 35, preferably also the stem 30, is made of a magnetizable material.

As schematically shown in FIG. 1, the servo valve needle 3 is arranged and aligned in the control chamber 10B such that the stem 30 extends along the longitudinal axis L1 and the flat anchor 35 extends along the radial direction R1; in particular, the stem 30 can be arranged or aligned coaxially with the longitudinal axis L1. The first end region 31 with the sealing section 31 herein faces the control opening 13, and the second end region 32 with the flat anchor 35 faces the partition 14.

As further schematically shown in FIG. 1, the spring 5 preloads the servo valve needle 3 to a closed position in which the servo valve needle 3 seals the control opening 13. In particular, in the closed position of the servo valve needle 3, the sealing section 34 can abut a servo valve seat 13S defined by the control opening 13, and the flat anchor 35 can be arranged at a distance from the partition 14, as schematically shown in FIG. 1. The sealing seat 13S can in particular be formed by an area of the housing 1 surrounding the control opening 13. A gap is formed between the flat anchor 35 and the partition 14 in the closed position of the servo valve needle 3, as schematically shown in FIG. 1. The servo valve needle 3 is generally preloaded along the longitudinal axis L1 to a closed position in which the servo valve needle 3 seals the control opening 13.

Figure 2:
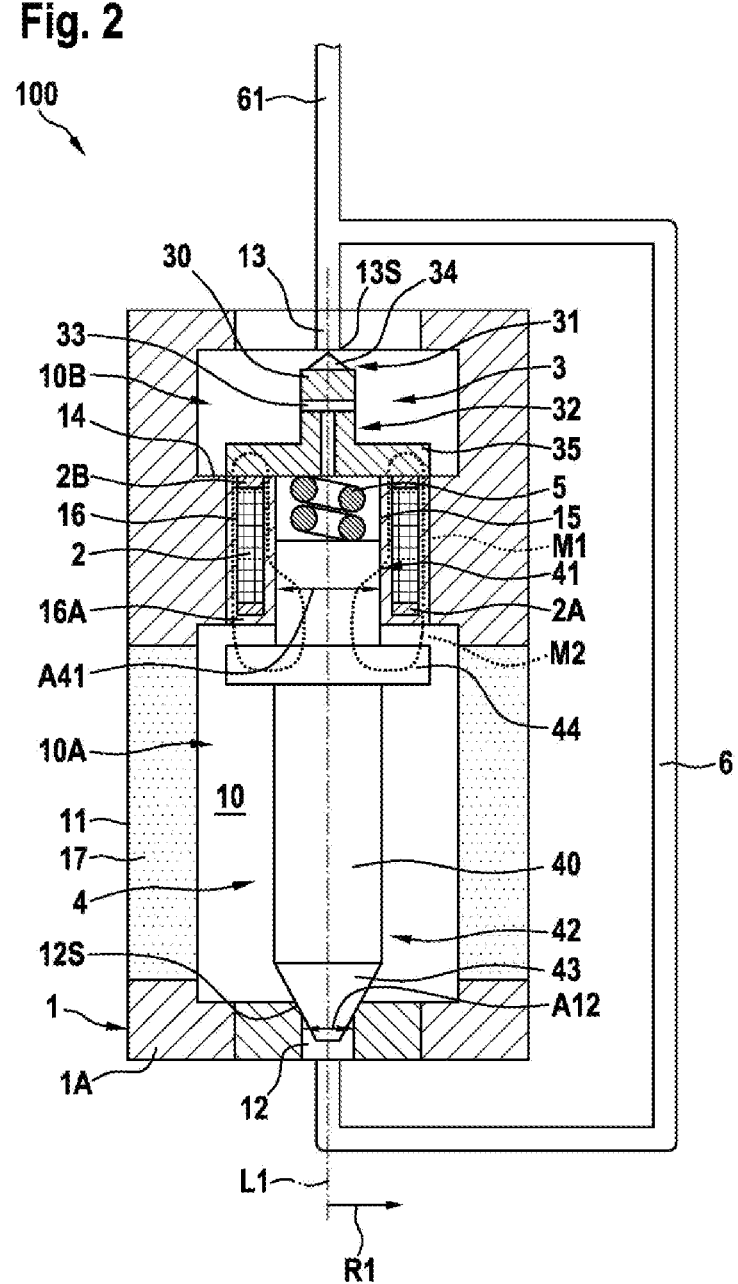
FIG. 2 the shut-off valve shown in FIG. 1, the servo valve needle being arranged in an open position and the main valve needle being arranged in a closed position.

By applying an electrical voltage to the coil 2, which generates a current flow through the coil 2, a magnetic field, in particular a primary magnetic field M1, can be generated around the coil 2, thereby exerting an attraction force on the control valve needle 30. The servo valve needle 3 is thereby moved in the direction of the partition 14 opposite to the preloading force exerted by the spring 5, whereby the sealing section 34 is lifted from the sealing seat 13S. The servo valve needle 3 is thereby generally movable to an opening position by means of a magnetic field that can be generated by the coil 2 along the longitudinal axis L1. The opening position of the servo valve needle 3 is schematically shown in FIG. 2. As schematically shown in FIG. 2, the sealing section 34 is arranged in the opening position of the servo valve needle 3 at a distance from the servo valve seat 13S, and the flat anchor 35 abuts the partition 14. In general, the servo valve needle 3 thereby exposes the control opening 13 in the open position and abuts the partition 14. As schematically shown in FIG. 2, the guide hole 15 is fluidically conductively connected to the guide hole 15 in the opening position of the servo valve needle 3 through the connecting channel 33.

The main valve needle 4 is arranged in the outlet chamber 10A. As schematically shown in FIG. 1, the main valve needle 40 can comprise a stem, a sealing section 43, and an optional flat anchor 44. The stem 40 of the main valve needle 4 extends between a first end region 41 and a second end region 42 arranged opposite thereto. The sealing section 43 is formed in the second end region 42 of the stem 40, and can in particular form a second end of the stem 40. For example, the sealing section 43 can be conical, as schematically shown in FIG. 1. The optional flat anchor 44 is arranged adjacently to the first end region 41 of the stem 40, and is connected to the stem 40. As schematically shown in FIG. 1, the flat anchor 44 extends transversely to and protrudes from the stem 40. At least the flat anchor 44, preferably also the stem 40 of the main valve needle 4, is made of a magnetizable material.

As schematically shown in FIG. 1, the main valve needle 4 is arranged in the outlet chamber 10A such that the first end region 41 of the stem projects into the guide hole 15 and is guided through the guide hole 15, and the second end region 42 faces the sealing section 43 of the outlet opening 12. In particular, the stem 40 of the main valve needle 4 can be coaxially aligned with the longitudinal axis L1. The flat anchor 44, which can e.g. be designed as a bar that extends around the stem 40, thereby protrudes from the stem 40 in the radial direction R1.

FIG. 1 shows the main valve needle 4 in a closed position in which it seals the outlet opening 12. As schematically shown in FIG. 1, the main valve needle 4 is preloaded to the closed position by the spring 5. Optionally, one and the same spring 5, which can be arranged in the guide hole 15 as shown as an example in FIG. 1, can preload the main valve needle 4 and the servo valve needle 3 to their respective closed positions. However, it is also conceivable that separate springs are provided for the main valve needle 4 and the servo valve needle 3. These can also be arranged outside of the guide hole 15. As schematically shown in FIG. 1, in the closed position of the main valve needle 4, the sealing section 43 abuts a main valve seat 12S defined by the outlet opening 12, and the flat anchor 44 is at a distance from the partition 14 such that a gap is formed between the partition 14 and the flat anchor 44. For example, the main valve seat 12S can be formed by an area surrounding the outlet opening 12. The stem 40 of the main valve needle comprises a first cross-sectional area A41 in the first end region 41. A second cross-sectional area A12 is defined by an area by which the main valve seat 12S is circumscribed. As schematically shown in FIG. 1, the first cross-sectional area A12 is larger than a second cross-sectional area A12.

Figure 3:
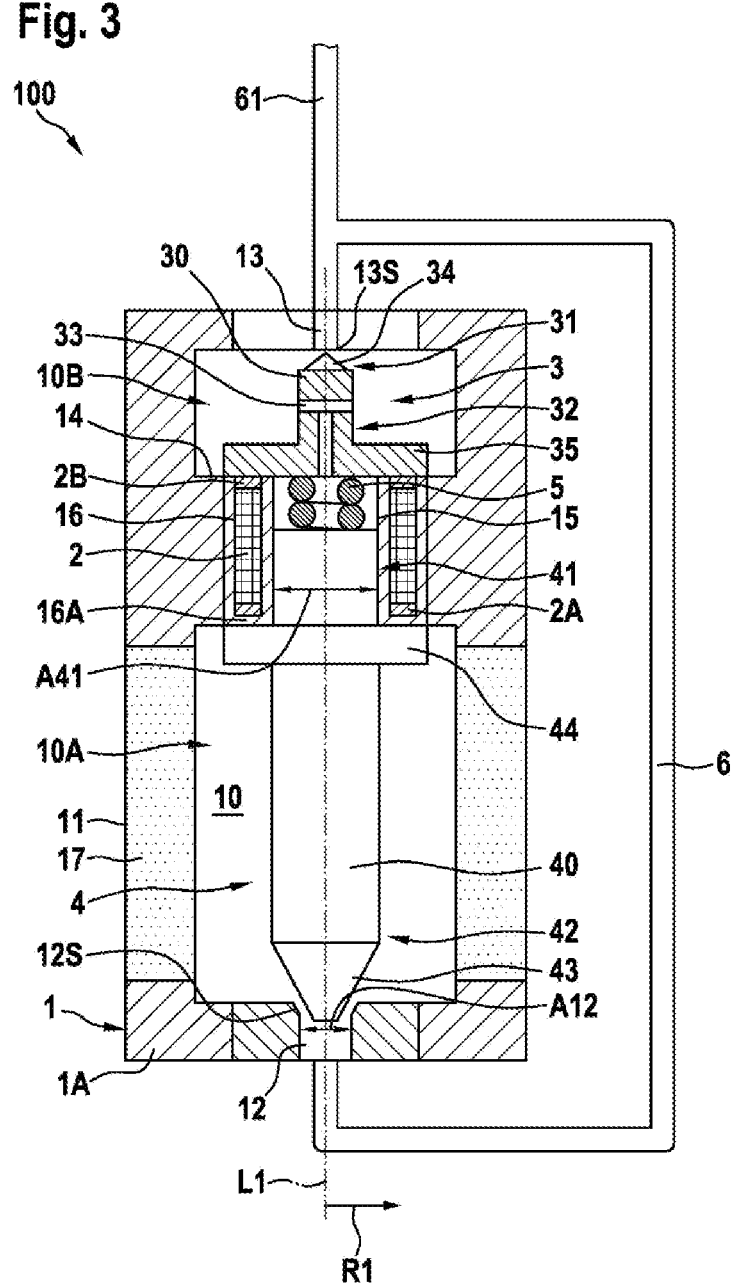
FIG. 3 the shut-off valve shown in FIG. 1, the servo valve needle and the main valve needle each being arranged in an open position.

When the servo valve needle 3 is arranged in its open position, as schematically shown in FIG. 2, the control chamber 10B is fluidically connected by way of the control opening 13 to the pressure level of the connector 61, typically resulting in a pressure drop in the control chamber 10B. Generally, pressure communication between the control chamber 10B and the connector 61 takes place, so pressure communication between the control opening 13 and the outlet opening 12 also occurs thereby. A pressure drop relative to the outlet chamber 10A also takes place in the guide hole 15 via the connecting channel 33, which is why the main valve needle 4 is exposed to a pulling force that acts opposite to the preloading force generated by the spring 5. Depending on the pressure differential between the guide hole 15 and the outlet chamber 10A, this pulling force can be sufficient to lift the sealing section 43 of the main valve needle 40 from the main valve seat 12S. This is particularly facilitated when the second surface A12 is smaller than the first surface A41. Since the coil 2 is further powered when the servo valve needle 3 is arranged in the open position, a secondary magnetic field M2 is formed, which is shown purely schematically in FIG. 2. The secondary magnetic field M2 also exerts a pulling force that acts against the spring force on the main valve needle 4, so that it is moved to the open position shown in FIG. 3. As shown in FIG. 3, the optional flat anchor 44 lies against the partition 14 in the opening position of the main valve needle 4 and thereby advantageously forms a stop. The sealing section 43 of the main valve needle 4 is arranged at a distance from the main valve seat 12S in its open position. In general, the main valve needle 4 thereby exposes the outlet opening 11 in its open position.

The main valve needle 4 is thereby movable to the open position by means of the magnetic field that can be generated by the coil 2, when the servo valve needle 3 is arranged in its open position. The pressure drop in the control chamber 10B as a result of the opening of the servo valve needle 3 advantageously reduces the force required for this purpose, which enables a compact design of the coil 2. However, the shut-off valve 100 can also be designed such that even without a pressure differential between the control chamber 10B and the outlet chamber 10A, it is possible to open the main valve needle 4. Given the servo valve needle 3 abuts the partition 14 in its closed position, a state of magnetic saturation can be achieved in the optional residual separator 16A if the latter is designed to be sufficiently thin. A high magnetic attraction force is thereby generated in the gap between the flat anchor 44 of the main valve needle 4 and the partition 14. Doing so generally facilitates opening of the main valve needle 4, which is not limited to situations where there is no pressure differential between control chamber 10B and outlet chamber 10A.

Due to the compact design of the shut-off valve 100, this gas tank device 200 can optionally be accommodated in the outlet opening 211 of the high-pressure gas tank 210, as schematically shown in FIG. 4. Generally, the inlet opening 11 of the shut-off valve 100 is connected to the outlet opening 211 of the tank 210. The outlet opening 12 and the control opening 13 of the housing 1 of the shut-off valve 100 are each connected to the fuel supply line 302, e.g., via the connector 61.

Although the present invention has been explained hereinabove with reference to exemplary embodiments, the invention is not limited thereto, and can instead be modified in a variety of ways. Combinations of the exemplary embodiments hereinabove are in particular also conceivable. Furthermore, the invention is not limited to use in a fuel cell system. For example, the gas tank device can also be used in conjunction with other systems in which gas, in particular hydrogen, is used as a fuel or reaction product. For purely exemplary purposes, one example is a vehicle that uses gaseous fuel to operate an internal combustion engine.

The invention claimed is:

1. A shut-off valve (100) for a gas tank device (200), comprising:
    a housing (1) which has an inlet opening (11) for connecting to a high-pressure tank (210), an outlet opening (12) for connecting to a supply line (302) and a control opening (13) for connecting to the supply line (302), wherein the housing (1) defines an inner space (10) extending along a longitudinal axis (L1) and has a partition (14) which, with respect to the longitudinal axis (L1), divides the interior space (10) into an outlet chamber (10A) and a control chamber (10B), wherein the partition (14) has a guide hole (15) which extends between the outlet chamber (10A) and the control chamber (10B);
    an electrical coil (2) which is accommodated in the partition (14) and surrounds the guide hole (15);
    a servo valve needle (3) which is arranged in the control chamber (10B), is preloaded along the longitudinal axis (L1) into a closed position in which the servo valve needle (3) seals the control opening (13) and can be moved by a magnetic field which can be generated by the coil (2), into an open position in which the servo valve needle (3) exposes the control opening (13) and abuts the partition (14), wherein the servo valve needle (3) has a connecting channel (33) which connects the control chamber (10B) to the guide hole (15) in the open position of the servo valve needle (3); and a main valve needle (4) which is movably guided in the guide hole (15) along the longitudinal axis (L1), is preloaded along the longitudinal axis (L1) into a closed position in which the main valve needle (4) seals the outlet opening (12), and, when the servo valve needle (3) is arranged in its open position, can be moved by the magnetic field which can be generated by the coil (2), into an open position in which the main valve needle (4) exposes the outlet opening (12).

2. The shut-off valve (100) according to claim 1, wherein the partition (14) comprises an accommodating recess (16) surrounding the guide hole (15), which recess extends as a blind hole from the control chamber (10B) along the longitudinal axis (L1), and wherein the coil (2) is arranged within the accommodating recess (16).

3. The shut-off valve (100) according to claim 1, wherein the main valve needle (4) comprises a stem (40) which is guided into a first end region (41) in the guide hole (15), and a sealing section (43) which is formed in a second end region (42) of the stem (40) and abuts a main valve seat (12S) defined by the outlet opening (12) when the main valve needle (4) is in the closed position.

4. The shut-off valve (100) according to claim 3, wherein the first end region (41) of the stem (40) of the main valve needle comprises a first cross-sectional area (A41) that is greater than a second cross-sectional area (A12) of the main valve seat (12S).

5. The shut-off valve (100) according to claim 3, wherein the main valve needle (4) comprises a flat anchor (44) which projects from the stem (40), is arranged at a distance from the partition (14) when the main valve needle (4) is in the closed position, and abuts the partition (14) when the main valve needle (4) is in the open position.

6. The shut-off valve (100) according to claim 1, wherein the servo valve needle (3) comprises a stem (30), a sealing section (34) formed on a first end region (31) of the stem (30), and a flat anchor (35) which is connected to a second end region (32) of the stem (30) and protrudes from the stem (30), wherein, when the servo valve needle (3) is in the closed position, the sealing section (34) abuts a servo valve seat (13S) defined by the control opening (13), and the flat anchor (35) is arranged at a distance from the partition (14), wherein, when the servo valve needle (3) is in the open position, the sealing section (34) is arranged at a distance from the servo valve seat (13S), and the flat anchor (35) abuts the partition (14).

7. The shut-off valve (100) according to claim 1, wherein the servo valve needle (3) and the main valve needle (4) are preloaded to their respective closed positions by a common spring (5) arranged in the guide hole (15).

8. The shut-off valve (100) according to claim 1, additionally comprising:
a control line (6) which connects the outlet opening (12) and the control opening (13) to each other in a fluidically conductive manner outside the inner space (10), and a connector (61) used for connection to the supply line (302).

9. The shut-off valve (100) according to claim 1, wherein the housing (1) comprises a first connector which is connected to the outlet opening (11) and used for connection to the supply line (302), and comprises a second connector which is connected to the control opening (13) and used for connection to the supply line (302).

10. A gas tank device (200) comprising:
a high-pressure gas tank (210) for accommodating gas; and
a shut-off valve (100) according to claim 1;
wherein the inlet opening (11) of the housing (1) of the shut-off valve (100) is connected to an outlet opening (211) of the high-pressure gas tank (210).

11. The gas tank device (200) according to claim 10, wherein the housing (1) of the shut-off valve (100) is accommodated in the outlet opening (211) of the high-pressure gas tank (210).

12. A fuel cell system (300), comprising:
a fuel cell system (310) comprising at least one fuel cell, a fuel inlet (311) for supplying gaseous fuel, an oxidation gas inlet (313) for supplying oxidation gas, and a product outlet (314) for removing reaction products;
a fuel supply line (302) connected to the fuel inlet (311); and
a gas tank device (200) according to claim 10;
wherein the outlet opening (12) and the control opening (13) of the housing (1) of the shut-off valve (100) are each connected to the fuel supply line (302).

13. The gas tank device (200) according to claim 10, wherein the gas tank device is for a fuel cell system (300).

* * * * *